H. G. VOIGHT.
LOCKING DEVICE FOR TIRE CARRIERS.
APPLICATION FILED DEC. 10, 1920.
1,420,226. Patented June 20, 1922.
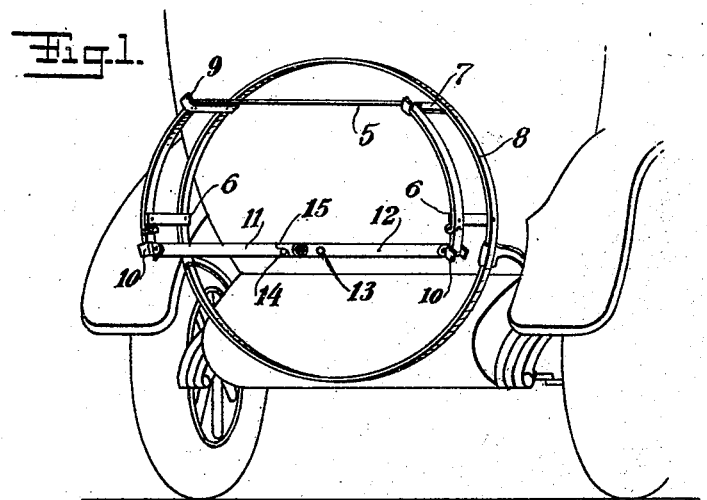
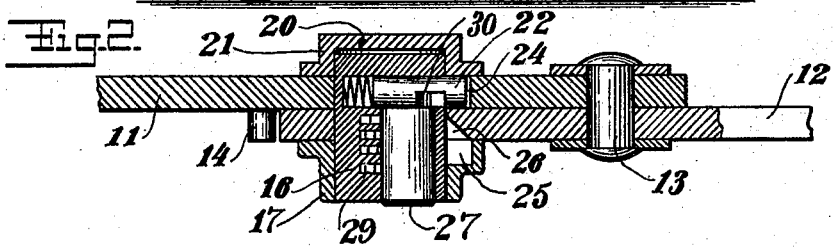
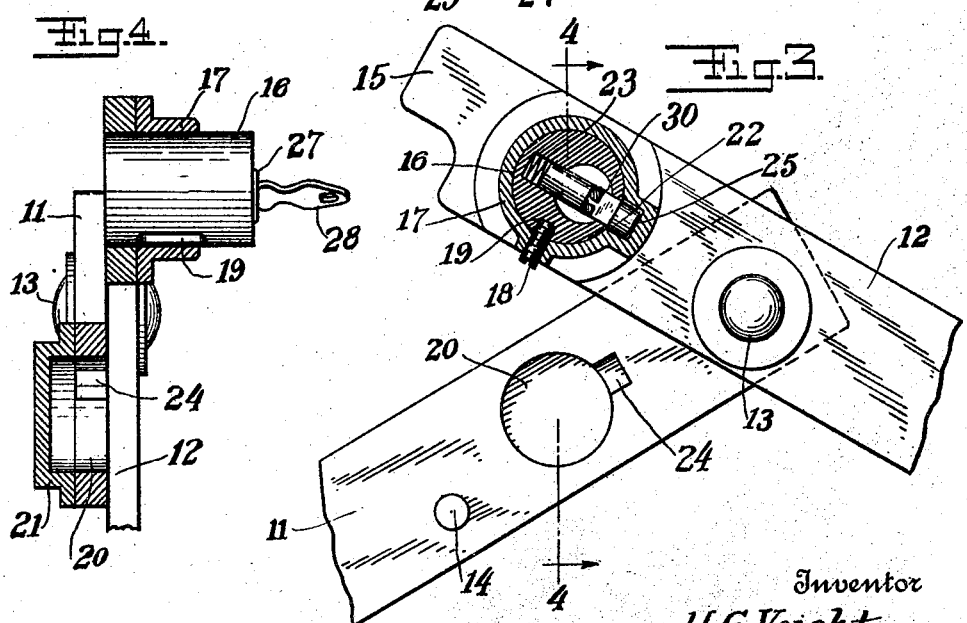
Inventor
H. G. Voight
By his Attorneys

UNITED STATES PATENT OFFICE.

HENRY G. VOIGHT, OF NEW HAVEN, CONNECTICUT.

LOCKING DEVICE FOR TIRE CARRIERS.

1,420,226.　　　　　Specification of Letters Patent.　Patented June 20, 1922.

Application filed December 10, 1920. Serial No. 429,614.

*To all whom it may concern:*

Be it known that I, HENRY G. VOIGHT, a citizen of the United States of America, residing at New Haven, New Haven County, Connecticut, have invented a new and useful Locking Device for Tire Carriers, of which the following is a specification.

The main object of my invention is to provide a simple but reliable and compact device for securely locking a tire carrier.

Another object is to provide a locking device which will be essentially a part of the tire carrier so that it cannot be mislaid or lost as frequently happens when padlocks are used.

In its preferred form, the invention contemplates the employment of a cylinder lock mounted in one of the toggle members of the carrier and co-acting with the other toggle member as a bolt. The movement of the cylinder is controlled by a spring pressed latch carried by the cylinder, which in turn is adapted to be retracted by the rotation of a key plug and key. Provision is also made for yieldingly holding the cylinder and latch in the unbolted position so that the key may be withdrawn if desired, and the bolt operated by hand to re-lock the parts.

Figure 1 is a perspective view of the rear end of a vehicle with a tire carrier and locking device embodying my invention.

Fig. 2 is a plan view and partial horizontal section of the parts of the locking device.

Fig. 3 is a rear view and vertical section showing the parts in their unlocked position.

Fig. 4 is a transverse vertical sectional view on the plane of the line 4—4 of Fig. 3.

I have shown the device as applied to a tire carrier of my invention, but it should be understood that the present invention is not limited to such a tire carrier. In the form shown, the bar 5 is supported by brackets 6—6 and 7—7 from a suitable support such as another tire carrier rim 8. The ends of the bracket 7—7 are flared outwardly to hold the tire rim in place. Gripping jaws 10—10 are hinged to the lower ends of the bar 5, and in turn hinged to toggle bars 11—12 which are pivoted to each other at 13. One of the bars is provided with a stop 14, and the other with a shoulder 15 to limit the downward swing of the parts into their locked position.

The lock cylinder 16 is mounted in the toggle bar 12 and adapted to reciprocate through the same horizontally. A hub 17 may be provided for giving additional bearing to the cylinder. This cylinder is prevented from rotating by a set screw 18, the inner end of which projects into the slot 19 in the cylinder. This also limits the transverse motion of the cylinder with reference to the bar 12. The other toggle bar is provided with a recess 20 and may have a socket member 21 to extend the recess and provide a cover or closure for the end of the cylinder 16. When I use the term cylinder, it should be understood that the cross-sectional shape is immaterial, but I have used this term as the one commonly employed to designate the housing or body of a lock of this type. It will be seen that when the inner end of the cylinder is projected into the recess 20, the two parts of the toggle are positively locked together, but that when the cylinder is drawn out into the position shown in Fig. 4, the toggle members are free to be operated so as to release the jaws 10—10. The cylinder carries a transversely operable latch member 22 which is preferably pressed by a spring 23 and engages in a notch 24 at one side of the recess 20 in the toggle bar 11. When the parts are in the position as shown in Fig. 2, this latch 22 prevents the cylinder 16 from being pulled outwardly, and thus prevents the unlocking of the toggle bars. The toggle bar 12 is also provided with a recess 25 to receive the end of the latch 22 when the cylinder 16 is drawn outwardly. The inclined shoulder 26 serves to retract the latch 22 when the cylinder is pushed inwardly again. The key plug 27 is rotatable in the cylinder 16 by means of a key 28 in the usual manner. Any number of pins 29 may be employed as customary in pin tumbler or cylinder locks. The rear end of the plug 27 is provided with member 30 for retracting the latch 22 when the plug is rotated.

The operation of the device is as follows:

When the parts are in the locked position of Fig. 2, the key is inserted in the plug 27 and rotated so as to retract the latch bolt 22 from the recess 24. The cylinder body 16 is then drawn outwardly by pulling upon the key into the position of Fig. 4, the set screw 18 preventing rotation of the body 16 and limiting its outward movement. When the key is withdrawn from the plug, the spring 23 pushes the latch bolt 22 into the recess 25, and the toggle bars 11 and 12 may then be operated to release the jaws 10. When the parts are again to be locked in position, the toggle bars are straightened out into the position shown in Fig. 1, and it is necessary merely to press upon the cylinder body 16 to push it into the position of Fig. 2, the latch bolt 22 sliding along the inclined shoulder 26 and snapping out again into the recess 24.

It will be seen that the parts are compact and easily operated to unlock or lock the device, and also that there are no loose parts or members to be mislaid, lost, or stolen.

I claim:—

1. A locking device for a tire carrier including two hinged toggle bars, a locking bolt carried by one bar and projecting into the other bar, a latch carried by said locking bolt for normally preventing movement thereof, and a key operable plug for retracting said latch.

2. In a locking device for a tire carrier, two bars mounted to move with relation to each other, a manually operable bolt carried by one bar and normally co-acting with the other bar to lock the parts against relative movement, a spring pressed latch normally controlling the movement of said bolt, and a key operated plug for retracting said latch.

3. In a construction of the character described, two bars hinged to each other, a transversely movable bolt carried by one bar and normally engaging the other bar, a latch carried by said bolt for normally preventing the movement thereof, a key operated plug for retracting said latch, the bar which carries said bolt having an inclined shoulder for automatically retracting said latch when said bolt is pushed into locking position.

4. In a construction of the character described, two bars hinged to each other, a bolt carried by one bar and normally engaging the other bar to hold them in locked relation, a spring pressed latch for controlling said bolt, a plug for retracting said latch, the bar which carries said bolt having an incline for automatically retracting said latch when said bolt is moved into said locking position.

5. A locking device for a tire carrier, comprising two bars movable with relation to each other, one of said bars having a recess with an extension therefrom, a locking bolt carried by the other bar and adapted to project into said recess to prevent relative movements of said bars, a latch bolt carried by said locking bolt and adapted to project into the extension from said recess to prevent movement of said locking bolt, and a key operable plug for releasing said latch bolt and withdrawing said locking bolt.

6. A locking device for a tire carrier, comprising two bars movable with relation to each other, one of said bars having a recess with an extension therefrom, a locking bolt carried by the other bar and adapted to project into said recess to prevent relative movements of said bars, a latch bolt carried by said locking bolt and adapted to project into the extension from said recess to prevent movement of said locking bolt, and a key operable plug for releasing said latch bolt and withdrawing said locking bolt, the bar which carries said locking bolt having a recess for the end of said latch bolt and an inclined shoulder adapted to retract said latch bolt.

7. A locking device for a tire carrier, comprising two relatively movable members, a locking bolt carried by one member and adapted to engage the other member to prevent relative movement of said members, a latch bolt carried by said locking bolt for preventing the movement of said locking bolt when said members are in their normally locked position, and means for retracting said latch bolt and said locking bolt by two separate movements of the same part.

8. In a locking device for tire carriers, two relatively movable members, a locking bolt carried by one member and adapted to engage the other member to prevent relative movements of said members, a spring pressed latch bolt carried by said locking bolt for normally preventing movement of said locking bolt, and key-operated means for retracting said latch bolt and releasing said locking bolt.

9. In a locking device for tire carriers, two relatively movable members, a locking bolt carried by one member and adapted to engage the other member to prevent relative movements of said members, a spring pressed latch bolt carried by said locking bolt for normally preventing movement of said locking bolt, key-operated means for retracting said latch bolt and releasing said locking bolt, and means for retaining said locking bolt in a retracted position.

10. In a locking device for tire carriers, two relatively movable members, a locking bolt carried by one member and adapted to engage the other member to prevent relative movements of said members, a spring pressed latch bolt carried by said locking bolt for normally preventing movement of said locking bolt, key-operated means for retracting said latch bolt and releasing said locking bolt, means for retaining said locking bolt in a retracted position, and means for automatically retracting said latch bolt when the locking bolt is moved into its locking position.

11. A locking device for a tire carrier, comprising two relatively movable members, a locking cylinder carried by one member and adapted to engage the other member, means for limiting the longitudinal movement of said locking cylinder, means for preventing rotation of said cylinder, a latch bolt carried by said cylinder for normally preventing movement thereof, and a plug for retracting said latch bolt.

12. A locking device for a tire carrier, comprising two relatively movable members, a locking cylinder carried by one member and adapted to engage the other member, means for limiting the longitudinal movement of said locking cylinder, means for preventing rotation of said cylinder, a latch bolt carried by said cylinder for normally preventing movement thereof, a plug for retracting said latch bolt, and a key for rotating said plug and disengaging said locking cylinder.

HENRY G. VOIGHT.